United States Patent
Ji et al.

(10) Patent No.: US 10,966,159 B2
(45) Date of Patent: Mar. 30, 2021

(54) UPLINK REFERENCE SIGNAL SENDING METHOD AND APPARATUS

(71) Applicant: HUAWEI TECHNOLOGIES CO., LTD., Guangdong (CN)

(72) Inventors: Liuliu Ji, Shanghai (CN); Long Qin, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/657,600

(22) Filed: Oct. 18, 2019

(65) Prior Publication Data
US 2020/0053660 A1 Feb. 13, 2020

Related U.S. Application Data

(63) Continuation of application No. PCT/CN2018/083311, filed on Apr. 17, 2018.

(30) Foreign Application Priority Data

Apr. 19, 2017 (CN) .......................... 201710257481.8

(51) Int. Cl.
*H04W 52/14* (2009.01)
*H04L 5/00* (2006.01)
(Continued)

(52) U.S. Cl.
CPC ......... *H04W 52/146* (2013.01); *H04L 5/0048* (2013.01); *H04W 52/325* (2013.01); *H04W 52/36* (2013.01); *H04W 52/24* (2013.01)

(58) Field of Classification Search
CPC .............. H04L 5/0048; H04W 52/146; H04W 52/325; H04W 52/36; H04W 52/24;
(Continued)

(56) References Cited

U.S. PATENT DOCUMENTS 8,948,158 B2 * 2/2015 Cai ....................... H04L 5/0053
370/350
2013/0045773 A1 2/2013 Xu et al.
(Continued)

FOREIGN PATENT DOCUMENTS

CN 103249167 A 8/2013
CN 104160733 A 11/2014
(Continued)

OTHER PUBLICATIONS

LG Electronics, "On SRS design and related operations" 3GPP TSG RAN WG1 Meeting # 88bis R1-1704892, Apr. 7, 2017, 7 pages.
(Continued)

*Primary Examiner* — Keith Ferguson
(74) *Attorney, Agent, or Firm* — Fish & Richardson P.C.

(57) ABSTRACT

Example uplink reference signal sending methods and apparatus are described. One example method includes sending signaling to a terminal device by an access network device. The terminal device determines a sequence type of an uplink reference signal based on the signaling. The terminal device determines transmit power of the uplink reference signal based on the sequence type of the uplink reference signal, and sends the uplink reference signal by using the transmit power of the uplink reference signal.

20 Claims, 5 Drawing Sheets

(51) Int. Cl.
*H04W 52/32* (2009.01)
*H04W 52/36* (2009.01)
*H04W 52/24* (2009.01)

(58) Field of Classification Search
CPC .......... H04W 72/0413; H04W 52/367; H04W 52/38; H04W 72/1284
See application file for complete search history.

(56) References Cited

U.S. PATENT DOCUMENTS

| | | | |
|---|---|---|---|
| 2013/0286958 A1 | 10/2013 | Liang et al. | |
| 2015/0043465 A1 | 2/2015 | Ouchi | |
| 2015/0049649 A1* | 2/2015 | Zhu | H04W 72/0473 370/277 |
| 2017/0086147 A1* | 3/2017 | Zhang | H04W 72/0446 |

FOREIGN PATENT DOCUMENTS

| | | |
|---|---|---|
| CN | 104429135 A | 3/2015 |
| EP | 2693813 A1 | 2/2014 |
| EP | 3229532 A1 | 10/2017 |
| WO | 2016101154 A1 | 6/2016 |
| WO | 2016181154 A1 | 11/2016 |

OTHER PUBLICATIONS

Huawei et al., "UL DMRS design for data transmission" 3GPP TSG RAN WG1 Meeting # 88bis, R1-1704237, Apr. 7, 2017, 4 pages.
NTT DOCOMO et al., "WF on UL TPC." 3GPP TSG RAN WG1 Meeting #87 Reno, USA, R1-1613724, Nov. 14-18, 2016, 2 pages.
Huawei et al., "Reference Signal design for UL based measurement, CSI acquisition, and beam management" 3GPP TSG RAN WG1 Meeting #86bis Lisbon, Portugal, R1-1609413, Oct. 10-14, 2016, 4 pages.
Huawei et al, Functionalities and design of reference signal for demodulation of UL Channels. 3GPP TSG RAN WG1 Meeting #87 Reno, USA, R1-1611246, Nov. 14-18, 2016, 5 pages.
Huawei et al., "WF on UL DM-RS" 3GPP TSG RAN WG1 Meeting #87, Reno, USA, R1-1613742, Nov. 14-18, 2016, 3 pages.
3GPP TS 36.213 V14.0.0 (Sep. 2016), 3rd Generation Partnership Project; Technical Specification Group Radio Access Network; Evolved Universal Terrestrial Radio Access (E-UTRA); Physical layer procedures(Release 14), 406 pages.
PCT International Search Report and Written Opinion in International Application No. PCT/CN2018/083,311, dated May 31, 2018, 13 pages (With English Translation).
Extended European Search Report issued in European Application No. 18787043.1 dated Mar. 13, 2020, 8 pages.
Office Action issued in Chinese Application No. 201710257481.8 dated Jun. 24, 2020, 13 pages (with English translation).

* cited by examiner

UPLINK REFERENCE SIGNAL SENDING METHOD AND APPARATUS

CROSS-REFERENCE TO RELATED APPLICATIONS

This application is a continuation of International Application No. PCT/CN2018/083311, filed on Apr. 17, 2018, which claims priority to Chinese Patent Application No. 201710257481.8, filed on Apr. 19, 2017. The disclosures of the aforementioned applications are hereby incorporated by reference in their entireties.

TECHNICAL FIELD

This application relates to the field of communications technologies, and in particular, to an uplink reference signal sending method and an apparatus.

BACKGROUND

In a long term evolution (LTE) network, a single carrier-orthogonal frequency division multiplexing (SC-OFDM) technology is used for uplink data transmission, and a cyclic prefix-orthogonal frequency division multiplexing (CP-OFDM) technology is used for downlink data transmission.

When a terminal device uses the SC-OFDM technology, a transmitted uplink reference signal, for example, a sounding reference signal (SRS), and a signal on an uplink shared channel (PUSCH) occupy consecutive frequency domain resources. Usually, in the LTE network, the SRS is transmitted on the last symbol of a subframe, and the subframe is not used for transmitting another signal. With the development of technologies, it is desired that the CP-OFDM technology can also be used for uplink data transmission. In addition, when a terminal device uses the CP-OFDM technology to send data, a more flexible resource mapping manner may be used. For example, the terminal device may send a signal in a frequency division multiplexing manner. For example, an uplink reference signal and a PUSCH may be frequency division multiplexed on one OFDM symbol.

In a 5th generation (5G) mobile communications system or a new radio access technology (NR), a terminal device may use the SC-OFDM technology and the CP-OFDM technology in an uplink transmission process, and the CP-OFDM technology allows an uplink reference signal and another signal to be frequency division multiplexed on one OFDM symbol. In the prior art, transmit power of an uplink reference signal is determined for a case that only the SC-OFDM technology is used. If transmit power of an uplink reference signal is still determined in the prior-art manner, uplink reference signal transmission reliability may be reduced.

SUMMARY

This application provides an uplink reference signal sending method and an apparatus, to improve uplink reference signal transmission reliability.

According to a first aspect, an uplink reference signal sending method is provided. The method includes: receiving, by a terminal device, signaling sent by an access network device; determining, by the terminal device, a sequence type of an uplink reference signal based on the signaling; determining, by the terminal device, transmit power of the uplink reference signal based on the sequence type of the uplink reference signal; and sending, by the terminal device, the uplink reference signal by using the transmit power of the uplink reference signal.

According to a second aspect, an uplink reference signal sending apparatus is provided. The apparatus includes units or means for performing the steps in the first aspect. In addition, a terminal device may be further provided, and the terminal device includes the apparatus.

According to a third aspect, an uplink reference signal sending apparatus is provided. The apparatus includes at least one processing element and at least one storage element, where the at least one storage element is configured to store a program and data, and the at least one processing element is configured to perform the steps of the method provided in the first aspect of this application. In addition, a terminal device may be further provided, and the terminal device includes the apparatus.

According to a fourth aspect, an uplink reference signal sending apparatus is provided. The apparatus includes at least one processing element (or chip) for performing the steps of the method in the first aspect. In addition, a terminal device may be further provided, and the terminal device includes the apparatus.

According to a fifth aspect, a computer program is provided. When being executed by a processing element, the program is used to perform the steps of the method in the first aspect.

According to a sixth aspect, a computer storage medium is provided, and is configured to store, for example, the program described in the fifth aspect.

It can be learned that, in the foregoing aspects, considering that the terminal device may transmit the uplink reference signal by using different technologies in different cases and each technology has a corresponding sequence type of the uplink reference signal, the transmit power of the uplink reference signal is determined based on the sequence type of the uplink reference signal, so as to improve uplink reference signal transmission reliability.

The following describes several optional manners based on the first aspect. Correspondingly, the apparatus part also has corresponding optional manners, and details are not described in the following.

Optionally, in the first aspect, (1) the signaling is used to indicate the sequence type of the uplink reference signal; or (2) there is a correspondence between information indicated by the signaling and the sequence type of the uplink reference signal, and the terminal device determines, based on the correspondence, the sequence type of the uplink reference signal corresponding to the information indicated by the signaling; or (3) the terminal device determines the sequence type of the uplink reference signal based on sending information of the signaling.

The signaling in (1) is understood as explicit signaling. To be specific, the access network device determines the sequence type of the uplink reference signal, and notifies the sequence type of the uplink reference signal to the terminal device by using the signaling. The signaling in (2) and (3) is understood as implicit signaling. To be specific, the terminal device needs to deduce the sequence type of the uplink reference signal based on the signaling.

To sum up, regardless of which of the foregoing three forms of signaling is used, the terminal device can effectively determine the sequence type of the uplink reference signal.

Optionally, the sending information of the signaling may include a scrambling manner of the signaling, a time-frequency resource occupied by the signaling, or a format of the signaling. That the terminal device determines the sequence type of the uplink reference signal based on sending information of the signaling includes: the terminal device determines the sequence type of the uplink reference signal based on the scrambling manner of the signaling, the time-frequency resource occupied by the signaling, or the format of the signaling.

There is a correspondence between the sequence type of the uplink reference signal and each of the scrambling manner of the signaling, the time-frequency resource occupied by the signaling, and the format of the signaling. For example, the correspondence may be expressed in a form of a table. The terminal device can effectively determine the sequence type of the uplink reference signal by searching the table.

Optionally, the determining, by the terminal device, transmit power of the uplink reference signal based on the sequence type of the uplink reference signal includes: determining, by the terminal device, initial power of the uplink reference signal based on a power parameter configured by the access network device, where the power parameter includes a parameter used to indicate a power offset, and the sequence type of the uplink reference signal is used to adjust the power offset; and selecting smaller power from the initial power and an uplink transmit power threshold, as the transmit power of the uplink reference signal.

Optionally, the determining, by the terminal device, transmit power of the uplink reference signal based on the sequence type of the uplink reference signal includes: determining, by the terminal device, initial power of the uplink reference signal based on a power parameter configured by the access network device, where the sequence type of the uplink reference signal is used to adjust the initial power of the uplink reference signal; and selecting smaller power from adjusted initial power of the uplink reference signal and an uplink transmit power threshold, as the transmit power of the uplink reference signal.

It can be learned that, in the foregoing method, the power offset or the initial power of the uplink reference signal can be adjusted by using the sequence type of the uplink reference signal, so that the transmit power of the uplink reference signal is more suitable for the corresponding sequence type of the uplink reference signal, thereby improving uplink reference signal transmission reliability.

Optionally, the uplink transmit power threshold is maximum uplink transmit power or a difference between maximum uplink transmit power and physical uplink shared channel transmit power.

In addition, according to a seventh aspect, a communication method is further provided. The method includes: sending, by an access network device, signaling to a terminal device, where the signaling is used to indicate a sequence type of an uplink reference signal, so that the terminal device determines transmit power of the uplink reference signal based on the sequence type of the uplink reference signal, and sends the uplink reference signal by using the transmit power of the uplink reference signal.

Optionally, before the sending, by an access network device, signaling to a terminal device, the method further includes: determining, by the access network device, the sequence type of the uplink reference signal based on at least one of uplink bandwidth allocated by the access network device to the terminal device, an uplink channel quality parameter, indication information used to indicate whether transmit power of the terminal device is limited, and power headroom information, for example, a power headroom report (PHR), of the terminal device.

Optionally, the determining, by the access network device, the sequence type of the uplink reference signal based on uplink bandwidth allocated by the access network device to the terminal device includes: when the uplink bandwidth allocated by the access network device to the terminal device is greater than a preset bandwidth threshold, determining that the sequence type of the uplink reference signal is a first sequence type; when the uplink bandwidth allocated by the access network device to the terminal device is less than a preset bandwidth threshold, determining that the sequence type of the uplink reference signal is a second sequence type; or when the uplink bandwidth allocated by the access network device to the terminal device is equal to a preset bandwidth threshold, determining that the sequence type of the uplink reference signal is a first sequence type or a second sequence type. The first sequence type includes more orthogonal sequences than the second sequence type, and a peak-to-average power ratio of the first sequence type is greater than that of the second sequence type.

Optionally, when the uplink channel quality parameter is a path loss of an uplink channel, the determining, by the access network device, the sequence type of the uplink reference signal based on an uplink channel quality parameter includes: when the path loss of the uplink channel is less than a preset path loss threshold, determining that the sequence type of the uplink reference signal is a first sequence type; when the path loss of the uplink channel is greater than a preset path loss threshold, determining that the sequence type of the uplink reference signal is a second sequence type; or when the path loss of the uplink channel is equal to a preset path loss threshold, determining that the sequence type of the uplink reference signal is a first sequence type or a second sequence type. When the uplink channel quality parameter is a signal to interference plus noise ratio (SINR), the determining, by the access network device, the sequence type of the uplink reference signal based on an uplink channel quality parameter includes: when the SINR is greater than a preset SINR threshold, determining that the sequence type of the uplink reference signal is a first sequence type; when the SINR is less than a preset SINR threshold, determining that the sequence type of the uplink reference signal is a second sequence type; or when the SINR is equal to a preset SINR threshold, determining that the sequence type of the uplink reference signal is a first sequence type or a second sequence type.

Optionally, the determining, by the access network device, the sequence type of the uplink reference signal based on indication information includes: when the indication information indicates that the transmit power of the terminal device is not limited, determining that the sequence type of the uplink reference signal is a first sequence type; or when the indication information indicates that the transmit power is limited, determining that the sequence type of the uplink reference signal is a second sequence type.

Optionally, the determining, by the access network device, the sequence type of the uplink reference signal based on a PHR includes: when the access network device determines, based on the PHR, that the terminal device is in a center of a cell, determining that the sequence type of the uplink reference signal is a first sequence type; or when the access network device determines, based on the PHR, that the terminal device is at an edge of a cell, determining that the sequence type of the uplink reference signal is a second sequence type.

According to an eighth aspect, this application provides a communications apparatus. The communications apparatus is used for an access network device, and includes units or means for performing the steps in any one of the seventh aspect or the optional manners of the seventh aspect.

According to a ninth aspect, this application provides a communications apparatus. The communications apparatus is used for an access network device, and includes at least one processing element and at least one storage element. The at least one storage element is configured to store a program and data, and the at least one processing element is configured to perform the steps of the method provided in any one of the seventh aspect or the optional manners of the seventh aspect of this application.

According to a tenth aspect, this application provides a communications apparatus. The communications apparatus is used for an access network device, and includes at least one processing element (or chip) configured to perform the steps of the method provided in any one of the seventh aspect or the optional manners of the seventh aspect.

According to an eleventh aspect, this application provides a computer program product. When being executed by a processing element, the program is used to perform the steps of the method in any one of the seventh aspect or the optional manners of the seventh aspect.

According to a twelfth aspect, this application provides a computer storage medium, configured to store, for example, the program described in the eleventh aspect.

This application provides the uplink reference signal sending method and the apparatus. The method includes: The access network device sends the signaling to the terminal device, the terminal device determines the sequence type of the uplink reference signal based on the signaling, the terminal device determines the transmit power of the uplink reference signal based on the sequence type of the uplink reference signal, and the terminal device sends the uplink reference signal by using the transmit power of the uplink reference signal. It can be learned that, in the foregoing aspects, the sequence type of the uplink reference signal is introduced during determining of the transmit power of the uplink reference signal, so that the transmit power is more suitable for sending such an uplink reference signal, thereby improving uplink reference signal transmission reliability.

DESCRIPTION OF EMBODIMENTS

For ease of understanding by a person skilled in art, the following explains some terms in this application.

(1) Terminal device: A terminal device is also referred to as user equipment (UE), a mobile station (MS), a mobile terminal (MT), or the like, and is a device providing voice and/or data connectivity for a user, for example, a handheld device or vehicle-mounted device having a wireless connection function. Currently, some examples of terminal devices are: a mobile phone, a tablet computer (Pad), a notebook computer, a palmtop computer, a mobile Internet device (MID), a wearable device, for example, a smartwatch, a smart band, or a pedometer, a computer having a wireless transceiver function, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, and a wireless terminal in a smart home.

(2) Radio access network (RAN): A radio access network is a part, of a network, connecting a terminal device to a wireless network. A RAN node or device is a node or device in the radio access network, and may also be referred to as a base station or an access network device. Currently, some examples of access network devices are: a gNB, a transmission reception point (TRP), an evolved NodeB (eNB), a radio network controller (RNC), a NodeB (NB), a base station controller (BSC), a base transceiver station (BTS), a home NodeB (for example, a Home evolved NodeB, or a Home NodeB, HNB), a baseband unit (BBU), and a Wi-Fi access point (AP). In addition, in a network structure, the RAN may include a centralized unit (CU) node and a distributed unit (DU) node, and the access network device may be a CU node or a DU node. Such a structure splits a protocol layer of an eNB in long term evolution (LTE). Some functions of the protocol layer are controlled by a CU in a centralized manner, some or all of remaining functions of the protocol layer are distributed in DUs, and the CU controls the DUs in a centralized manner. A specific technology and a specific device form that are used for a radio access network device are not limited in embodiments of this application.

(3) "A plurality of" means two or more than two. Other quantifiers are similar to this. The term "and/or" describes an association relationship between associated objects and represents that three relationships may exist. For example, A and/or B may represent the following three cases: Only A exists, both A and B exist, and only B exists. The character "/" generally indicates an "or" relationship between associated objects.

The following describes the embodiments of this application with reference to accompanying drawings.

Figure 1:
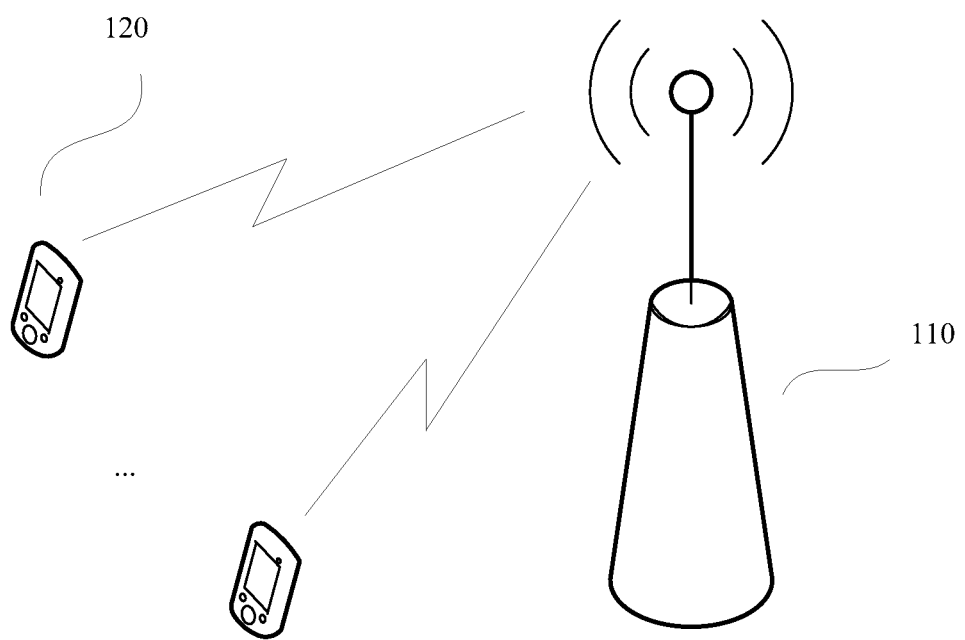
FIG. 1 is a schematic diagram of a communications system according to an embodiment of this application.

FIG. 1 is a schematic diagram of a communications system according to an embodiment of this application. As shown in FIG. 1, a terminal device 120 accesses a wireless network via an access network device 110, to obtain services of an external network (for example, the Internet) through the wireless network or communicate with another terminal device through the wireless network. The access network device 110 may send a downlink reference signal to the terminal device 120, and the terminal device 120 performs downlink channel measurement based on the downlink reference signal and reports channel state information (CSI) to the access network device 110. In addition, the terminal device 120 may send an uplink reference signal to the access network device 110, so that the access network device 110 performs uplink channel measurement. For example, the reference signal sent by the terminal device 120 may be an SRS.

Figure 2:
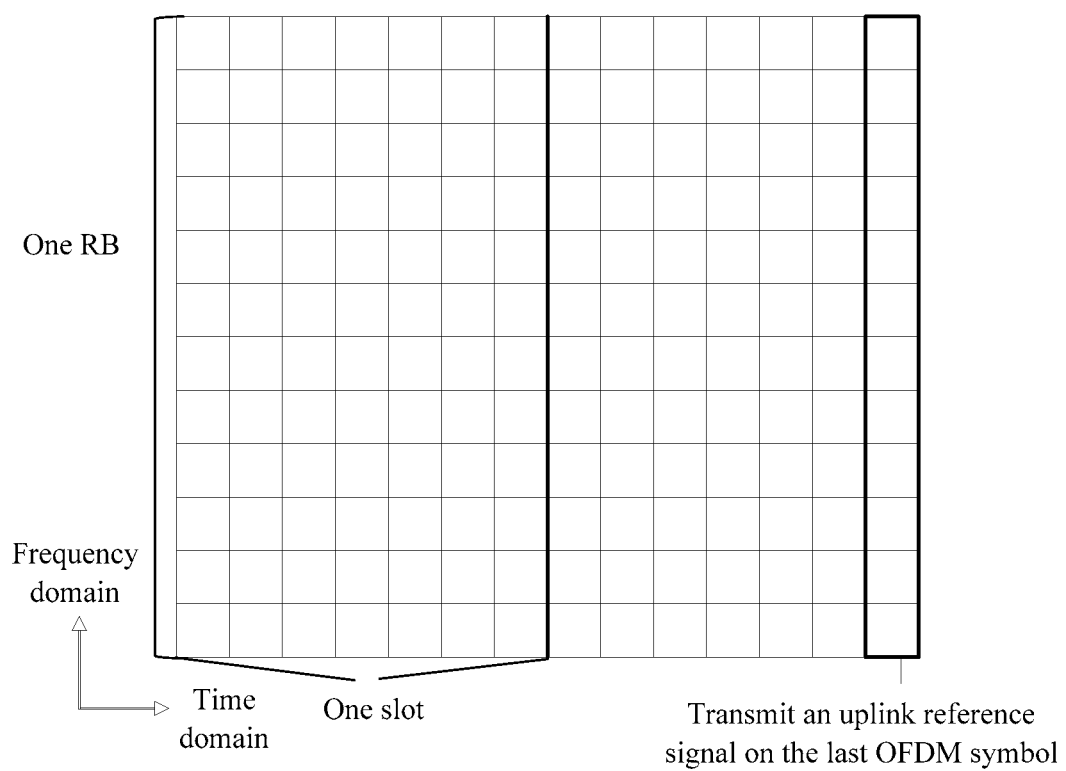
FIG. 2 is a schematic diagram of a time-frequency resource occupied by an uplink reference signal when an SC-OFDM technology is used.

In an LTE network, an SC-OFDM technology is used for uplink transmission, and an uplink reference signal and a signal on a PUSCH usually occupy consecutive frequency domain resources. FIG. 2 is a schematic diagram of a time-frequency resource occupied by an uplink reference signal when an SC-OFDM technology is used. In FIG. 2, a horizontal axis represents a time domain, one subframe includes two slots, and each slot includes seven OFDM symbols; and a vertical axis represents a frequency domain, and one resource block (RB) includes 12 subcarriers. A smallest unit of a time-frequency resource is a resource element (RE), as shown by a small grid in FIG. 2. The RE occupies one OFDM symbol in time domain, and occupies one subcarrier in frequency domain. In the LTE network, the uplink reference signal is usually transmitted on the last OFDM symbol of a subframe, and the subframe is not used for transmitting another signal.

A discrete Fourier transform (DFT) spread orthogonal frequency division multiplexing DFT-S-OFDM technology is one of SC-OFDM technologies.

In the LTE network, a CP-OFDM technology is used for downlink transmission. Compared with the SC-OFDM technology, the CP-OFDM technology uses a more flexible resource mapping manner. Therefore, with the development of technologies, it is desired that the CP-OFDM technology can also be used for uplink transmission, so that a terminal device can send a signal in a frequency division multiplexing manner, for example, an uplink reference signal and a PUSCH can be frequency division multiplexed on one OFDM symbol, thereby increasing resource utilization.

In a 5G mobile communications system or in NR, a terminal device may use the SC-OFDM technology and the CP-OFDM technology in an uplink transmission process, so that different technologies, that is, the SC-OFDM technology and the CP-OFDM technology, can be used in different cases. In the existing LTE network, a method for determining transmit power of an uplink reference signal is designed based on the SC-OFDM technology. If the method is still used in 5G or NR, uplink reference signal transmission reliability may be reduced.

The uplink reference signal and the downlink reference signal are pilot signals that are often mentioned. The pilot signal is a known signal that is provided by a transmit end for a receive end and that is used for channel estimation or channel sounding. Such a known signal is, for example, a known sequence. In the embodiments of this application, when a terminal device determines transmit power of an uplink reference signal, a sequence type of the uplink reference signal may be introduced, so that the transmit power is more suitable for sending such an uplink reference signal, thereby improving uplink reference signal transmission reliability.

For example, when uplink transmission supports two technologies: the SC-OFDM technology and the CP-OFDM technology, the SC-OFDM technology may be applied to a terminal device with limited transmit power, for example, a terminal device located at an edge of a cell; and the CP-OFDM technology may be applied to a terminal device with high transmit power, for example, a terminal device located in a center of a cell. The terminal device with limited transmit power has a relatively high requirement on a peak-to-average power ratio (PAPR), and therefore can use a sequence with a relatively low PAPR, for example, a ZC sequence. The terminal device with high transmit power has a relatively low requirement on a PAPR, and therefore can use a sequence with a relatively high PAPR, for example, a Gold sequence. It can be learned that 5G or NR supports uplink reference signals with a plurality of sequence types. In the embodiments of this application, a sequence type of an uplink reference signal is introduced during determining of transmit power of the uplink reference signal, so that the transmit power is more suitable for sending such an uplink reference signal, thereby improving uplink reference signal transmission reliability.

Figure 3:
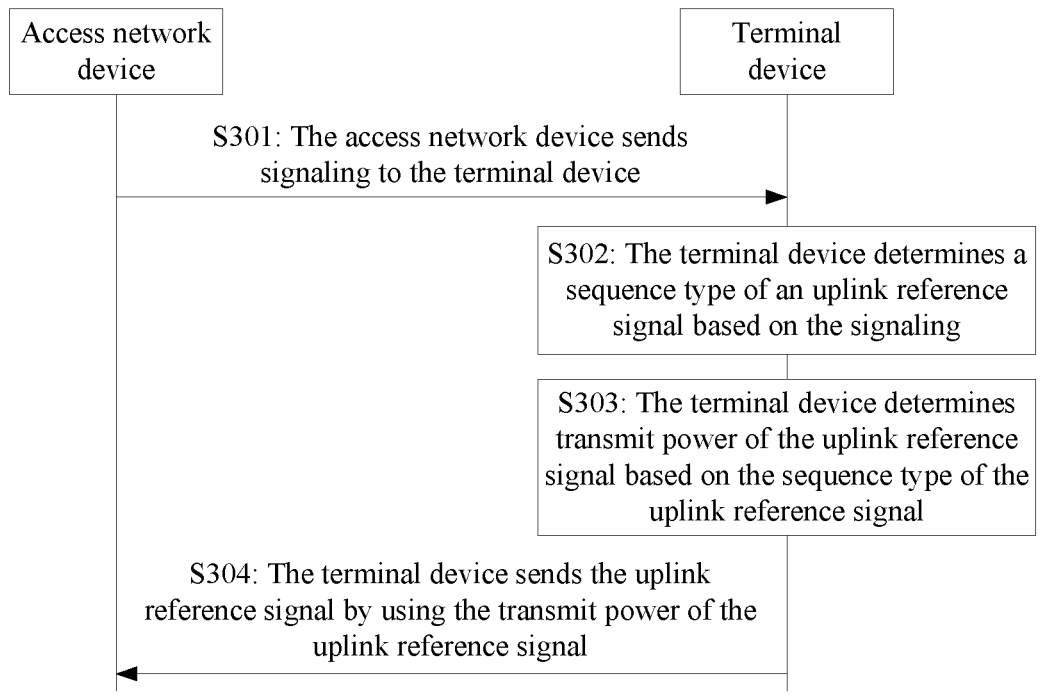
FIG. 3 is an interaction flowchart of an uplink reference signal sending method according to an embodiment of this application.

FIG. 3 is an interaction flowchart of an uplink reference signal sending method according to an embodiment of this application. As shown in FIG. 3, the method includes the following steps:

Step S301: An access network device sends signaling to a terminal device, that is, the terminal device receives the signaling sent by the access network device.

Step S302: The terminal device determines a sequence type of an uplink reference signal based on the signaling.

Step S303: The terminal device determines transmit power of the uplink reference signal based on the sequence type of the uplink reference signal.

Step S304: The terminal device sends the uplink reference signal by using the transmit power of the uplink reference signal.

In this embodiment of this application, considering that the terminal device may transmit the uplink reference signal by using different technologies in different cases and each technology has a corresponding sequence type of the uplink reference signal, the transmit power of the uplink reference signal is determined based on the sequence type of the uplink reference signal, so as to improve uplink reference signal transmission reliability.

Descriptions are provided with reference to step S301 and step S302: The access network device may notify the sequence type of the uplink reference signal to the terminal device by using explicit signaling, or may notify the sequence type of the uplink reference signal to the terminal device by using implicit signaling. The explicit signaling means that the signaling is used to indicate the sequence type of the uplink reference signal. The implicit signaling means that the signaling is not used to indicate the sequence type of the uplink reference signal, but the terminal device can deduce the sequence type of the uplink reference signal based on the signaling. The following describes the following three cases.

In a first case, the signaling in step S301 and step S302 is explicit signaling. To be specific, the sequence type of the uplink reference signal is notified to the terminal device by using the explicit signaling, and the signaling is used to indicate the sequence type of the uplink reference signal. The signaling may be physical layer signaling or higher layer signaling. For example, the signaling may be carried in downlink control information (DCI) or a radio resource control (RRC) message. In addition, the signaling may be alternatively carried in a media access control control element (MAC CE). The sequence type of the uplink reference signal is explicitly indicated in content of the signaling. The content may be the sequence type itself, or may be identification information used to identify the sequence type. For example, the signaling includes an information element Seq. A quantity of bits of the Seq is determined based on a quantity of sequence types that need to be indicated. For example, the Seq includes one bit. In this case, the Seq is used to indicate two sequence types. As shown in Table 1, when the Seq is 0, the Seq indicates a first sequence type; and when the Seq is 1, the Seq indicates a second sequence type. The Seq is merely an example of the identification information, but is not intended to limit this application. In addition, the following manner may be alternatively used:

When the Seq is 0, the Seq indicates a second sequence type; and when the Seq is 1, the Seq indicates a first sequence type. In this application, a PAPR corresponding to the first sequence type is greater than a PAPR corresponding to the second sequence type. In addition, the first sequence type includes more orthogonal sequences than the second sequence type, and orthogonality of the second sequence type is better than orthogonality of the first sequence type. For example, the first sequence type may be a Gold sequence. The second sequence type may be a ZC sequence. The sequence type of the uplink reference signal in this application may alternatively be a block-based cyclically shifted ZC sequence, a pseudo-random sequence type, or the like. This is not limited in this application. Details are not described again in the following.

TABLE 1

| Seq | Sequence type of an uplink reference signal |
| --- | --- |
| 0 | First sequence type |
| 1 | Second sequence type |

It can be learned that, in the foregoing method, the access network device determines the sequence type of the uplink reference signal, and notifies the sequence type of the uplink reference signal to the terminal device. Specifically, the access network device may determine the sequence type of the uplink reference signal based on at least one of uplink bandwidth allocated by the access network device to the terminal device, an uplink channel quality parameter, indication information used to indicate whether transmit power of the terminal device is limited, and power headroom information (PHR) of the terminal device.

In an implementation, the access network device obtains uplink bandwidth requested by the terminal device. For example, the access network device receives a buffer status report (BSR) that requests a time-frequency resource and that is sent by the terminal device. After receiving the BSR, the access network device allocates the uplink bandwidth to the terminal device by using a scheduling algorithm. In addition, the access network device can determine the sequence type of the uplink reference signal based on the information. When the access network device determines that the terminal device requests bandwidth from the access network device and that the uplink bandwidth allocated by the access network device to the terminal device is greater than a preset bandwidth threshold, the access network device determines that the terminal device shall use a CP-OFDM technology. In this case, the terminal device has a relatively low requirement on a PAPR, and therefore the access network device may adaptively configure, for the terminal device, a first sequence type with more orthogonal sequences and a larger PAPR. When the access network device determines that the terminal device requests bandwidth from the access network device and that the uplink bandwidth allocated by the access network device to the terminal device is less than a preset bandwidth threshold, the terminal device shall use an SC-OFDM technology. In this case, the terminal device has a relatively high requirement on a PAPR, and therefore the access network device may adaptively configure, for the terminal device, a second sequence type with better orthogonality, fewer orthogonal sequences, and a smaller PAPR. The preset threshold may be a quantity representing a frequency domain resource size. In addition, when the uplink bandwidth allocated by the access network device to the terminal device is equal to a preset bandwidth threshold, the terminal device may use a CP-OFDM technology or an SC-OFDM technology. In this case, the access network device may adaptively configure a first sequence type or a second sequence type for the terminal device.

In another implementation, in a communication process, the access network device receives a pilot signal, for example, a demodulation reference signal (DMRS) or an SRS, sent by the terminal device. The access network device can estimate quality of an uplink channel based on the received pilot signal. The quality of the uplink channel may be expressed by using an uplink channel quality parameter, including a path loss of the uplink channel, a signal to interference plus noise ratio (SINR) of the uplink channel, or the like. For example, when the access network device determines that the path loss of the uplink channel is less than a preset path loss threshold or the SINR of the uplink channel is greater than a preset SINR threshold, the access network device may configure, for the terminal device, a first sequence type with more orthogonal sequences and a larger PAPR. Conversely, when the access network device determines that the path loss of the uplink channel is greater than a preset path loss threshold or the SINR of the uplink channel is less than a preset SINR threshold, the access network device may configure, for the terminal device, a second sequence type with better orthogonality, fewer orthogonal sequences, and a smaller PAPR. When the access network device determines that the path loss of the uplink channel is equal to a preset path loss threshold or the SINR of the uplink channel is equal to a preset SINR threshold, the access network device may adaptively configure a first sequence type or a second sequence type for the terminal device.

In still another implementation, the terminal device may report a transmit power capacity of the terminal device in a capacity reporting process. For example, the terminal device reports indication information indicating whether the transmit power of the terminal device is limited. When the indication information indicates that the transmit power of the terminal device is not limited, for example, the terminal device is in a center of a cell, the terminal device shall use a CP-OFDM technology. In this case, the terminal device has a relatively low requirement on a PAPR, and therefore the access network device may adaptively configure, for the terminal device, a first sequence type with more orthogonal sequences and a larger PAPR. When the indication information indicates that the transmit power is limited, for example, the terminal device is at an edge of a cell, the terminal device shall use an SC-OFDM technology. In this case, the terminal device has a relatively high requirement on a PAPR, and therefore the access network device may adaptively configure, for the terminal device, a second sequence type with better orthogonality, fewer orthogonal sequences, and a smaller PAPR.

In yet another implementation, the terminal device may report a transmit power capacity of the terminal device in a capacity reporting process. For example, the terminal device reports power headroom information (for example, PHR) of the terminal device. When the access network device determines, based on the PHR, that the terminal device is in a center of a cell, the terminal device shall use a CP-OFDM technology. In this case, the terminal device has a relatively low requirement on a PAPR, and therefore the access network device may adaptively configure, for the terminal device, a first sequence type with more orthogonal sequences and a larger PAPR. When the access network device determines, based on the PHR, that the terminal device is at an edge of a cell, the terminal device shall use an SC-OFDM technology. In this case, the terminal device has a relatively high requirement on a PAPR, and therefore the access network device may adaptively configure, for the terminal device, a second sequence type with better orthogonality, fewer orthogonal sequences, and a smaller PAPR. Specifically, a process of determining, by the access network device based on the PHR, whether the terminal device is in the center of the cell includes: When the PHR of the terminal device is greater than a preset PHR threshold, it indicates that higher power may be used, and the access network device determines that the terminal device is in the center of the cell; when the PHR of the terminal device is less than a preset PHR threshold, it indicates that lower power may be used, and the access network device determines that the terminal device is at the edge of the cell; or when the PHR of the terminal device is equal to a preset PHR threshold, the access network device determines that the terminal device is in the center of the cell or at the edge of the cell.

Optionally, the foregoing four optional implementations may be alternatively combined in this application, to determine the sequence type of the uplink reference signal. For example, the access network device may determine priorities corresponding to the four types of information: the uplink bandwidth allocated by the access network device to the terminal device, the uplink channel quality parameter, the indication information used to indicate whether the transmit power of the terminal device is limited, and the power headroom information of the terminal device. The priorities may be preconfigured by the access network device. Then the access network device determines a first sequence type set based on information with a highest priority. The first sequence type set includes a plurality of sequence types. The access network device continues to select some elements from the first sequence type set based on information with a second highest priority, as a second sequence type set, until an element is selected from the last but one sequence type set based on information with a lowest priority, as a final sequence type of the uplink reference signal.

When any sequence type set includes only one element, the terminal device determines that the unique element is the sequence type of the uplink reference signal.

In a second case, the signaling in step S301 and step S302 is implicit signaling. To be specific, the sequence type of the uplink reference signal is notified to the terminal device by using the implicit signaling. There is a correspondence between information indicated by the signaling and the sequence type of the uplink reference signal, and the terminal device determines, based on the correspondence, the sequence type of the uplink reference signal corresponding to the information indicated by the signaling. The signaling may be physical layer signaling or higher layer signaling. For example, the signaling may be carried in DCI or an RRC message. In addition, the signaling may be alternatively carried in an MAC CE.

For example, the access network device sends uplink grant information to the terminal device. The information includes the implicit signaling. The signaling is used to indicate a bandwidth resource used by the terminal device for uplink sending. After receiving the implicit signaling, the terminal device may perform parsing to determine bandwidth used for uplink transmission. The terminal device determines the sequence type of the uplink reference signal based on a correspondence between the bandwidth used for uplink transmission and the sequence type of the uplink reference signal. The correspondence between the bandwidth used for uplink transmission and the sequence type of the uplink reference signal may be: When the bandwidth used for uplink transmission is less than N frequency domain resources (the frequency domain resource may be, for example, a resource block or a resource unit), the terminal device uses a second sequence type; when the bandwidth used for uplink transmission is greater than N frequency domain resources, the terminal device uses a first sequence type; or when the bandwidth used for uplink transmission is equal to N frequency domain resources, the terminal device may use a first sequence type or a second sequence type. N is a positive integer.

Alternatively, for example, the access network device sends uplink grant information to the terminal device. The information includes the implicit signaling. The signaling is used to indicate that the terminal device uses an SC-OFDM technology or a CP-OFDM technology. After receiving the implicit signaling, the terminal device may determine the sequence type of the uplink reference signal based on a correspondence between the SC-OFDM technology and the sequence type of the uplink reference signal or a correspondence between the CP-OFDM technology and the sequence type of the uplink reference signal.

It can be learned that the sequence type of the uplink reference signal may be implicitly notified to the terminal device by using an existing signaling sent by the access network device to the terminal device, where correspondence between information indicated by the signaling and a sequence type is preset. In this way, a quantity of used signaling can be reduced, thereby reducing air-interface overheads.

In a third case, the terminal device determines the sequence type of the uplink reference signal based on sending information of the signaling. The sending information of the signaling may be a scrambling manner of the signaling, a time-frequency resource occupied by the signaling, or a format of the signaling.

In an implementable manner, the access network device may have an agreement, in advance with the terminal device, a correspondence between a scrambling manner and a sequence type of an uplink reference signal. The correspondence may be expressed in a form of a table, for example, Table 2.

TABLE 2

| Scrambling manner | Sequence type of an uplink reference signal |
| --- | --- |
| Scrambling manner 1 | First sequence type |
| Scrambling manner 2 | Second sequence type |

After receiving the signaling, the terminal device determines the scrambling manner used by the access network device to send the signaling. The terminal device searches the table to determine a sequence type corresponding to the scrambling manner, as the sequence type of the uplink reference signal. For example, the terminal device determines, based on the received signaling, that the scrambling manner used by the access network device is the scrambling manner 1; and searches the table to determine that the used sequence type of the uplink reference signal is the first sequence type.

In another implementable manner, the access network device may have an agreement, in advance with the terminal device, a correspondence between a time-frequency resource occupied by signaling and a sequence type of an uplink reference signal. It is assumed that a unit of the time-frequency resource is an RE, and each RE is corresponding to unique index information. The correspondence is a correspondence between index information of an RE and a sequence type of an uplink reference signal. The correspondence may be expressed in a form of a table, for example, Table 3.

TABLE 3

| Index information of an RE | Sequence type of an uplink reference signal |
|---|---|
| 0 | First sequence type |
| 1 | Second sequence type |
| 2 | First sequence type |
| 3 | Second sequence type |
| 4 | First sequence type |

For example, if the terminal device determines that the time-frequency resource occupied for sending the signaling by the access network device is the RE 3, the terminal device searches the table to determine that the sequence type of the uplink reference signal is the second sequence type.

In still another implementable manner, the access network device may have an agreement, in advance with the terminal device, a correspondence between a format of signaling and a sequence type of an uplink reference signal. The correspondence may be expressed in a form of a table, for example, Table 4.

TABLE 4

| Format of signaling | Sequence type of an uplink reference signal |
|---|---|
| Format 1 | First sequence type |
| Format 2 | Second sequence type |

After receiving the signaling, the terminal device determines the format of the signaling sent by the access network device. The terminal device searches the table to determine a sequence type corresponding to the format, as the sequence type of the uplink reference signal. For example, the terminal device determines, based on the received signaling, that the format of the signaling is the format 1; and searches the table to determine that the used sequence type of the uplink reference signal is the first sequence type.

In step S303, the terminal device may determine the transmit power of the uplink reference signal in the following four cases.

In a first case, on a time domain resource for sending the uplink reference signal, the terminal device sends only the uplink reference signal, and does not send another signal. The time domain resource may be, for example, one or more OFDM symbols or one or more slots. The uplink reference signal may be an SRS, and the another signal may be, for example, a signal on a PUSCH, a signal on an uplink control channel (PUCCH), or a demodulation reference signal (DMRS). This is not limited in this application.

In a second case, on a time domain resource for sending the uplink reference signal, the terminal device not only sends the uplink reference signal but also sends another signal. A priority of the another signal is higher than that of the uplink reference signal. For example, on an OFDM symbol, the terminal device not only sends the uplink reference signal but also sends a signal on a PUSCH.

In a third case, on a time domain resource for sending the uplink reference signal, the terminal device not only sends the uplink reference signal but also sends another signal. A priority of the another signal is lower than that of the uplink reference signal.

In a fourth case, on a time domain resource for sending the uplink reference signal, the terminal device not only sends the uplink reference signal but also sends another signal. A priority of the another signal is the same as that of the uplink reference signal.

Further, step S303 may include the following two optional manners:

In a first optional manner, step S303 includes: The terminal device determines initial power of the uplink reference signal based on a power parameter configured by the access network device, where the power parameter includes a parameter used to indicate a power offset, and the sequence type of the uplink reference signal is used to adjust the power offset; and selects smaller power from the initial power and an uplink transmit power threshold, as the transmit power of the uplink reference signal.

In a second optional manner, step S303 includes: The terminal device determines initial power of the uplink reference signal based on a power parameter configured by the access network device, where the sequence type of the uplink reference signal is used to adjust the initial power of the uplink reference signal; and selects smaller power from adjusted initial power of the uplink reference signal and an uplink transmit power threshold, as the transmit power of the uplink reference signal.

The uplink transmit power threshold is maximum uplink transmit power or a difference between maximum uplink transmit power and PUSCH transmit power.

It should be noted that the uplink reference signal in this application may be a sounding reference signal (SRS), or may be a signal that is similar to an SRS and that is in 5G or NR. Therefore, a parameter with a subscript SRS in the following formula may be understood as a parameter related to the uplink reference signal.

The following provides detailed descriptions in regard to the four cases of step S303 with reference to the foregoing two optional manners.

In regard to the first case with reference to the first optional manner, the transmit power $P_{SRS,c}(i)$ of the uplink reference signal is determined based on formula (1), where $P_{SRS,c}(i)$ represents the transmit power of the uplink reference signal of the terminal device in a subframe i in a current serving cell c.

$$P_{SRS,c}(i) = \min\{P_{CMAX,c}(i), P_{SRS\_OFFENSET,c}(m) + 10\log(M_{SRS,c}) + P_{O\_PUSCH,c}(i) + \alpha_c(j) \cdot PL_c + f_c(i)\} \quad (1)$$

The power parameter configured by the access network device includes the parameter $P_{SRS\_OFFSET,c}(m)$ used to indicate a power offset, where $P_{SRS\_OFFSET,c}(m)$ specifically represents a power offset between sending the uplink reference signal in the current serving cell c and sending the PUSCH in the current serving cell c. When m=0, it indicates that the terminal device periodically sends an uplink reference signal. When m=1, it indicates that the terminal device aperiodically sends an uplink reference signal. The power parameter configured by the access network device further includes other parameters, for example, $M_{SRS,c}$ used to represent transmission bandwidth of the uplink reference signal in the current serving cell c; $P_{O\_PUSCH,c}(j)$ representing a power density reference of the PUSCH in the subframe i in the current serving cell c, where j=0, 1, or 2; $\alpha_c(j)$ representing a path loss adjustment factor in the subframe i in the current serving cell c; $f_c(i)$ representing a power adjustment value sent by the access network device, where the power adjustment value is a dynamic power adjustment amount determined by the access network device for the PUSCH sent in the subframe i in the current serving cell c;

and $PL_c$ representing a path loss of the current serving cell c, and calculated by the terminal device. For example, $PL_c$ may be calculated by the terminal device based on transmit power configured by the access network device and receive power of the terminal device. The calculation method is familiar to a person skilled in the art, and details are not described herein.

In addition, $P_{CMAX,c}(i)$ in formula (1) represents the uplink transmit power threshold, and specifically represents maximum uplink transmit power in the subframe i in the current serving cell c.

Formula (1) has a same form as an existing transmit power determining formula. The parameter $P_{SRS\_OFFSET,c}(m)$ may be adjusted based on the sequence type of the uplink reference signal, so that the determined transmit power is more suitable for a corresponding reference signal type. Manners for determining other parameters may be the same as prior-art manners, and details are not described herein.

The terminal device determines the initial power of the uplink reference signal based on the second item in { } in formula (1). The terminal device selects smaller power from the initial power and the uplink transmit power threshold $P_{CMAX,c}(i)$, as the transmit power $P_{SRS,c}(i)$ of the uplink reference signal.

The transmit power of the uplink reference signal may be alternatively determined based on formula (2) in this application:

$$P_{SRS,c,b}(i) = \{P_{CMAX,c,b}(i), P_{SRS\_OFFSET,c,b}(m) + 10 \log_{10}(M_{SRS,c,b}) + P_{O\_PUSCH,c,b}(j) + \alpha_{c,b}(j) \cdot PL_{c,b} + f_{c,b}(i)\} \quad (2).$$

A difference between formula (2) and formula (1) lies in that a subscript b is added. Formula (2) indicates that the transmit power of the uplink reference signal is determined based on the current serving cell c and a beam b. $P_{SRS,c,b}(i)$ specifically represents the transmit power of the uplink reference signal of the terminal device on the beam b in the subframe i in the current serving cell c. $P_{CMAX,c,b}(i)$ represents the uplink transmit power threshold, and specifically represents maximum uplink transmit power on the beam b in the subframe i in the current serving cell c. $P_{SRS\_OFFSET,c,b}(m)$ specifically represents a power offset between sending the uplink reference signal on the beam b in the current serving cell c and sending the PUSCH on the beam b in the current serving cell c. When m=0, it indicates that the terminal device periodically sends an uplink reference signal. When m=1, it indicates that the terminal device aperiodically sends an uplink reference signal. $M_{SRS,c,b}$ represents transmission bandwidth of the uplink reference signal on the beam b in the current serving cell c. $P_{O\_PUSCH,c,b}(j)$ represents a power density reference of the PUSCH on the beam b in the subframe i in the current serving cell c. $\alpha_{c,b}(j)$ represents a path loss adjustment factor on the beam b in the subframe i in the current serving cell c. $PL_{c,b}$ represents a path loss on the beam b in the current serving cell c. $f_{c,b}(i)$ represents a power adjustment value sent by the access network device, where the power adjustment value is a dynamic power adjustment amount used by the access network device for the PUSCH sent on the beam b in the subframe i in the current serving cell c.

It should be noted that formula (1) may be carried out based only on the current serving cell c, without considering the subframe i. Similarly, formula (2) may be carried out based only on the current serving cell c, without considering the subframe i or the beam b. This is not limited in this application.

Further, an initial value $P_{SRS\_OFFSET,c}'(m)$ of of $P_{SRS\_OFFSET,c}(m)$ in formula (1) and an initial value $P_{SRS\_OFFSET,c,b}'(m)$ of $P_{SRS\_OFFSET,c,b}(m)$ in formula (2) may be configured by using a radio resource control (RRC) message. Both $P_{SRS\_OFFSET,c}'(m)$ and $P_{SRS\_OFFSET,c,b}'(m)$ may be specific values provided in an existing protocol. This is not limited in this embodiment of this application. It should be noted that the sequence type of the uplink reference signal is not considered in the existing protocol.

Further, a deltaMCS-Enabled parameter has been configured in the prior art. The parameter indicates whether power adjustment and control related to a modulation and coding scheme (MCS) is enabled. When deltaMCS-Enabled is set to 0, it indicates that MCS-related power adjustment and control of the PUSCH is not enabled. In this case, Ks=0. When deltaMCS-Enabled is set to 1, it indicates that MCS-related power adjustment and control of the PUSCH is enabled. In this case, Ks=1.25.

A correspondence between Ks and an intermediate value $P_{SRS\_OFFSET,c}''(m)$ of $P_{SRS\_OFFSET,c}(m)$ is shown in Table 5.

TABLE 5

| Ks | $P''_{SRS\_OFFSET,\,c}(m)$ |
|---|---|
| 0 | $P'_{SRS\_OFFSET,\,c}(m) - 3$ decibels (dB) |
| 1.25 | $-10.5 + 1.5 \times P'_{SRS\_OFFSET,\,c}(m)$ |

A correspondence between a sequence type of an uplink reference signal and $P_{SRS\_OFFSET,c}(m)$ is shown in Table 6.

TABLE 6

| Sequence type of an uplink reference signal | $P_{SRS\_OFFSET,\,c}(m)$ |
|---|---|
| First sequence type (for example, a Gold sequence) | $P''_{SRS\_OFFSET,\,c}(m) - 3$ dB |
| Second sequence type (for example, a ZC sequence) | $P''_{SRS\_OFFSET,\,c}(m)$ |

The correspondence in the table indicates that, if the sequence type of the uplink reference signal is the first sequence type, the transmit power of the uplink reference signal needs to be reduced based on $P_{SRS\_OFFSET,c,b}''(m)$; or if the sequence type of the uplink reference signal is the second sequence type, power adjustment does not need to be additionally performed.

It should be noted that a correspondence between Ks and $P_{SRS\_OFFSET,c,b}''(m)$ is similar to that in Table 5. A correspondence between a sequence type of an uplink reference signal and $P_{SRS\_OFFSET,c,b}(m)$ is similar to that in Table 6. Details are not described again.

A reason why power adjustment is performed for the first sequence type but is not performed for the second sequence type is that autocorrelation and cross-correlation features of the second sequence type are superior to those of the first sequence type. Therefore, interference between terminal devices using the second sequence type is smaller, and interference between terminal devices using the first sequence type is larger. An objective of a power control algorithm is to ensure optimal demodulation performance of quality of a signal from each terminal device to the access network device (for example, to ensure demodulation performance of a remote terminal device, the remote terminal device usually requires higher transmit power to compensate for a path loss), and smallest interference to other terminal devices (for example, to reduce interference between terminal devices, a dynamic adjustment and control factor is included in power control, so as to reduce transmit power of a terminal device with large interference).

Therefore, for the first sequence type and the second sequence type that have different demodulation and interference features, a power adjustment and control factor may be introduced. 3 dB in Table 5 is a power adjustment and control factor. A power adjustment and control rule is as follows: Transmit power of a terminal device using the first sequence type with poorer cross-correlation is adjusted to be slightly lower than transmit power of a terminal device using the second sequence type with better cross-correlation This application may be further expanded, that is, if the uplink reference signal has more than two sequence types, the foregoing power adjustment and control rule may also be used. This is not limited in this application.

In regard to the first case with reference to the second optional manner, the transmit power of the uplink reference signal is determined based on formula (3):

$$P_{SRS,c}(i) = \min\{P_{CMAX,c}(i), P_{SRS\_OFFSET,c}(m) + 10 \log_{10}(M_{SRS,c}) + P_{O\_PUSCH,c}(j) + \alpha_c(j) \cdot PL_c + f_c(i) + g_c(i)\} \quad (3).$$

In the first optional manner, power adjustment is embodied in $P_{SRS\_OFFSET,c}(m)$ or $P_{SRS\_OFFSET,c,b}(m)$, and in the second optional manner, power adjustment is embodied in $g_c(i)$. $P_{SRS\_OFFSET,c}(m)$ in formula (3) represents a power offset between sending the uplink reference signal in a current serving cell c and sending the PUSCH in a current serving cell c, and $P_{SRS\_OFFSET,c}(m)$ may be adjusted to $P_{SRS\_OFFSET,c}'(m)$ or $P_{SRS\_OFFSET,c}''(m)$. $g_c(i)$ represents a power offset between sending, based on the sequence type of the uplink reference signal, the uplink reference signal in the current serving cell c and sending, without based on the sequence type of the uplink reference signal, the uplink reference signal in the current serving cell c. The initial power of the uplink reference signal is determined by using other parameters, for example, a calculation manner of formula (3), in the second item in { } in formula (3) except $g_c(i)$. The second item in { } in formula (3) represents adjusted initial power of the uplink reference signal.

The terminal device selects smaller power from the adjusted initial power of the uplink reference signal and the uplink transmit power threshold $P_{CMAX,c}(i)$, as the transmit power of the uplink reference signal.

A correspondence between a sequence type of an uplink reference signal and $g_c(i)$ is shown in Table 7.

TABLE 7

| Sequence type of an uplink reference signal | $g_c(i)$ |
|---|---|
| First sequence type (for example, a Gold sequence) | 0 |
| Second sequence type (for example, a ZC sequence) | 3 dB |

Further, in formula (3), alternatively, the transmit power of the uplink reference signal may be determined by considering only the current serving cell c, without considering the subframe i. This is not limited in this application.

This application may be further expanded, that is, if the uplink reference signal has more than two sequence types, a power adjustment and control manner in Table 7 may also be used. This is not limited in this application.

A beamforming gain factor or the like may also be considered in the foregoing two optional manners. This is not limited in this embodiment of this application.

In regard to the second case with reference to the first optional manner, the transmit power of the uplink reference signal is determined based on formula (4):

$$P_{SRS,c}(i) = \min\{10 \log_{10}(\hat{P}_{CMAX,c}(i) - \hat{P}_{PUSCH,c}(i,n)), P_{SRS\_OFFSET,c}(m) + 10 \log_{10}(M_{SRS,c}) + P_{O\_PUSCH,c}(j) + \alpha_c(j) \cdot PL_c + f_c(i)\} \quad (4).$$

A difference between formula (4) and formula (1) lies in that $\hat{P}_{CMAX,c}(i)$ represents a linear value of maximum uplink transmit power in a subframe i in a current serving cell c. A parameter $\hat{P}_{PUSCH,c}(i,n)$ is added to formula (4). $\hat{P}_{PUSCH,c}(i,n)$ represents a linear value of PUSCH transmit power on an OFDM symbol n in the subframe i in the current serving cell c. If values of PUSCH power on all OFDM symbols in one subframe are the same, $\hat{P}_{PUSCH,c}(i,n)$ may also be written as $P_{PUSCH,c}(i)$. The first item in { } in formula (4) represents the uplink transmit power threshold. The uplink transmit power threshold is a difference between the maximum uplink transmit power and the PUSCH transmit power. Other parameters in formula (4) are the same as those in formula (1), and details are not described again.

With reference to the second optional manner, the transmit power of the uplink reference signal is determined based on formula (5):

$$P_{SRS,c}(i) = \min\{10 \log_{10}(\hat{P}_{CMAX,c}(i) - \hat{P}_{PUSCH,c}(i,n)), P_{SRS\_OFFSET,c}(m) + 10 \log_{10}(M_{SRS,c}) + P_{O\_PUSCH,c}(j) + \alpha_c(j) \cdot PL_c + f_c(i) + g_c(i)\} \quad (5).$$

A difference between formula (5) and formula (3) lies in that $\hat{P}_{CMAX,c}(i)$ represents a linear value of maximum uplink transmit power in a subframe i in a current serving cell c. A parameter $\hat{P}_{PUSCH,c}(i,n)$ is added to formula (5). $\hat{P}_{PUSCH,c}(i,n)$ represents a linear value of PUSCH transmit power on an OFDM symbol n in the subframe i in the current serving cell c. If values of PUSCH power on all OFDM symbols in one subframe are the same, $\hat{P}_{PUSCH,c}(i,n)$ may also be written as $\hat{P}_{PUSCH,c}(i)$. The first item in { } in formula (5) represents the uplink transmit power threshold. The uplink transmit power threshold is a difference between the maximum uplink transmit power and the PUSCH transmit power. Other parameters in formula (5) are the same as those in formula (3), and details are not described again.

It should be noted that $P_{PUSCH,c}(i,n)$ obtained through calculation by using an NR technology, for example, obtained through calculation by using a path loss, a dynamic offset, bandwidth, or reference power density, similar to a manner in the prior art.

In regard to the third case, on the time domain resource for sending the uplink reference signal, the terminal device not only sends the uplink reference signal but also sends another signal. A priority of the another signal is lower than that of the uplink reference signal.

In this case, a manner for calculating the transmit power of the uplink reference signal is the same as the manner used in the first case. Details are not described again.

Further, this application further provides a calculation method for calculating PUSCH transmit power. Details are as follows.

1. If a PUSCH, a PUCCH, and an uplink reference signal are sent together, power control of the PUSCH needs to be associated with power of the uplink reference signal, and PUSCH transmit power is calculated by using formula (6):

$$P_{PUSCH,c}(i) = \min\{10 \log_{10}(\hat{P}_{CMAX,c}(i) - \hat{P}_{PUSCH,c}(i) - \hat{P}_{SRS,c}(i)), 10 \log_{10}(M_{PUSCH,c}(i)) + P_{O\_PUSCH,c}(j) + \alpha_c(j) \cdot PL_c + \Delta_{TF,c}(i) + f_c(i)\} \quad (6).$$

$P_{PUSCH,c}(i)$ represents PUSCH transmit power of the terminal device in a subframe i in a current serving cell c. $\hat{P}_{CMAX,c}(i)$ represents a linear value of maximum uplink transmit power in the subframe i in the current serving cell c. $P_{PUCCH,c}(i)$ represents a linear value of PUCCH transmit power of the terminal device in the subframe i in the current serving cell c. $\hat{P}_{SRS,c}(i)$ represents a linear value of transmit power of the uplink reference signal of the terminal device in the subframe i in the current serving cell c. $\hat{P}_{PUSCH,c}(i)$ represents PUSCH transmission bandwidth in the current serving cell c. $\Delta_{TF,c}(i)$ represents an MCS-related power adjustment and control amount of the PUSCH. Meanings of other parameters in formula (6) are the same as those in formula (1), and details are not described again.

2. If a PUSCH and an uplink reference signal are sent together without a PUCCH, power control of the PUSCH needs to be associated with power of the uplink reference signal, and PUSCH transmit power is calculated by using formula (7):

$$P_{PUSCH,c}(i) = \min\{10 \log_{10}(\hat{P}_{CMAX,c}(i) - \hat{P}_{SRS,c}(i)), 10 \log_{10}(M_{PUSCH,c}(i)) + P_{O\_PUSCH,c}(j) + \alpha_c(j) \cdot PL_c + \Delta_{TF,c}(i) + f_c(i)\} \quad (7).$$

Meanings of parameters in formula (7) are the same as those in formula (6), and details are not described again.

In regard to the fourth case, on the time domain resource for sending the uplink reference signal, the terminal device not only sends the uplink reference signal but also sends another signal. A priority of the another signal is the same as that of the uplink reference signal.

When no uplink reference signals are mapped to a symbol to which the PUSCH is mapped or no PUSCHs are mapped to a symbol to which the uplink reference signal is mapped, PUSCH transmit power on such symbols is equal to PUSCH transmit power in a subframe and transmit power of the uplink reference signal on such symbols is equal to transmit power of the uplink reference signal in the subframe i.

That is, $P_{PUSCH,c}(i,k1) = P_{PUSCH,c}(i)$, and $P_{SRS,c}(i,k1) = P_{SRS,c}(i)$.

$P_{PUSCH,c}(i,k1)$ represents PUSCH transmit power on a symbol k1 in a subframe i in a current serving cell c. $P_{SRS,c}(i,k1)$ represents transmit power of the uplink reference signal on the symbol k1 in the subframe i in the current serving cell c. $P_{SRS,c}(i)$ may be obtained through calculation by using formula (1) or formula (3). $P_{PUSCH,c}(i)$ is obtained through calculation by using an NR technology, for example, obtained through calculation by using a path loss, a dynamic offset, bandwidth, or reference power density, similar to a manner in the prior art.

When the uplink reference signal is mapped to a symbol to which the PUSCH is mapped or the PUSCH is mapped to a symbol to which the uplink reference signal is mapped, and a priority of the PUSCH is the same as that of the uplink reference signal, if the sum of the PUSCH transmit power and the transmit power of the uplink reference signal is greater than maximum uplink transmit power $P_{CMAX,c}(i)$ in the subframe i in the current serving cell c, a scaling factor is used to reduce power.

For example, a formula $w_{PUSCH}(i)P_{PUSCH,c}(i,k2) + w_{SRS}(i)P_{SRS,c}(i,k2) \leq P_{CMAX,c}(i)$ is used to reduce the PUSCH transmit power and the transmit power of the uplink reference signal. Herein, $w_{PUSCH}(i)$ and $w_{SRS}(i)$ respectively represent a scaling factor corresponding to the PUSCH and a scaling factor corresponding to the uplink reference signal, and both have a value range of [0,1]. $P_{PUSCH,c}(i,k2)$ represents PUSCH transmit power on a symbol k2 in the subframe i in the current serving cell c. $P_{SRS,c}(i,k2)$ represents transmit power of the uplink reference signal on the symbol k2 in the subframe i in the current serving cell c. $P_{SRS,c}(i,k2)$ is the same as $P_{SRS,c}(i)$, and $P_{PUSCH,c}(i)$ may be obtained through calculation by using formula (1) or formula (3). $P_{PUSCH,c}(i,k2)$ is the same as $P_{PUSCH,c}(i)$, and $P_{PUSCH,c}(i)$ may be obtained through calculation by using an NR technology, for example, obtained through calculation by using a path loss, a dynamic offset, bandwidth, or reference power density, similar to a manner in the prior art.

To sum up, the transmit power of the uplink reference signal can be effectively calculated by using the foregoing formulas in this application. This ensures uplink reference signal transmission reliability.

Figure 4:
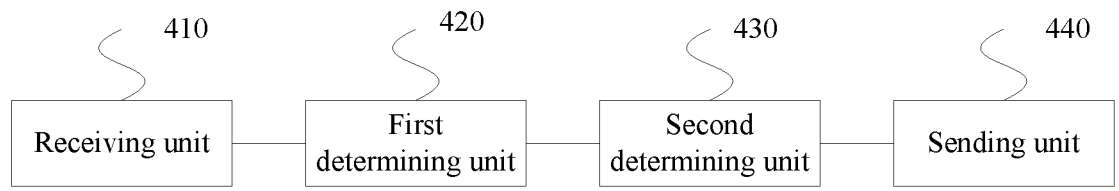
FIG. 4 is a schematic structural diagram of an uplink reference signal sending apparatus according to an embodiment of this application.

FIG. 4 is a schematic structural diagram of an uplink reference signal sending apparatus according to an embodiment of this application. The apparatus may be used for a terminal device. As shown in FIG. 4, the apparatus includes: a receiving unit 410, configured to receive signaling sent by an access network device; a first determining unit 420, configured to determine a sequence type of an uplink reference signal based on the signaling; a second determining unit 430, configured to determine transmit power of the uplink reference signal based on the sequence type of the uplink reference signal; and a sending unit 440, configured to send the uplink reference signal based on the transmit power of the uplink reference signal.

Explicit or implicit sequence type indication by the signaling, a sequence type determining manner, a transmit power determining manner, and the like are equivalent to those in the foregoing method embodiments.

For example, optionally, the signaling is used to indicate the sequence type of the uplink reference signal; or there is a correspondence between information indicated by the signaling and the sequence type of the uplink reference signal, and the first determining unit 420 is specifically configured to determine, based on the correspondence, the sequence type of the uplink reference signal corresponding to the information indicated by the signaling. Alternatively, the first determining unit 420 is specifically configured to determine the sequence type of the uplink reference signal based on sending information of the signaling.

Optionally, the first determining unit 420 is specifically configured to determine the sequence type of the uplink reference signal based on a scrambling manner of the signaling, a time-frequency resource occupied by the signaling, or a format of the signaling.

Optionally, the second determining unit 430 is specifically configured to: determine initial power of the uplink reference signal based on a power parameter configured by the access network device, where the power parameter includes a parameter used to indicate a power offset, and the sequence type of the uplink reference signal is used to adjust the power offset; and select smaller power from the initial power and an uplink transmit power threshold, as the transmit power of the uplink reference signal.

Optionally, the second determining unit 430 is specifically configured to: determine initial power of the uplink reference signal based on a power parameter configured by the access network device, where the sequence type of the uplink reference signal is used to adjust the initial power of the uplink reference signal; and select smaller power from adjusted initial power of the uplink reference signal and an uplink transmit power threshold, as the transmit power of the uplink reference signal.

Optionally, the uplink transmit power threshold is maximum uplink transmit power or a difference between maximum uplink transmit power and physical uplink shared channel transmit power.

The uplink reference signal sending apparatus provided in this embodiment of this application may be configured to perform the method steps corresponding to the foregoing terminal device. An implementation principle and a technical effect of the uplink reference signal sending apparatus are similar to those of the method steps, and details are not described again.

It should be understood that division of the units of the foregoing apparatus is merely logical function division. During actual implementation, all or some of the units may be integrated into one physical entity, or may be physically separated. In addition, all of the units may be implemented by software through invocation by a processing element, or may be implemented in a form of hardware. Alternatively, some of the units may be implemented by software through invocation by a processing element, and some of the units may be implemented in a form of hardware. For example, the units may be independently disposed processing elements, or may be integrated into a chip of the terminal device for implementation. In addition, each unit may be alternatively stored in a memory of the terminal device in a form of a program, and a processing element of the terminal device invokes and performs a function of the unit. Implementation of other units is similar to this. In addition, all or some of the units may be integrated together, or may be implemented independently. The processing element herein may be an integrated circuit capable of processing a signal. In an implementation process, steps of the foregoing method or the foregoing units may be implemented by using a hardware integrated logic circuit in the processing element, or by using instructions in a form of software. In addition, the receiving unit is a reception control unit, and can receive, through a receiving apparatus, for example, an antenna or a radio frequency apparatus, of the terminal device, information sent by the access network device. The sending unit is a sending control unit, and can send information to the access network device through a sending apparatus, for example, an antenna or a radio frequency apparatus, of the terminal device.

For example, the units may be one or more integrated circuits configured to implement the foregoing method, for example, one or more application-specific integrated circuits (ASIC), one or more microprocessors (DSP), or one or more field programmable gate arrays (FPGA). For another example, when one of the foregoing units is implemented by invoking a program by a processing element, the processing element may be a general purpose processor, for example, a central processing unit (CPU), or another processor that can invoke a program. For another example, the units may be integrated together and implemented in a system-on-a-chip (SOC) form.

Figure 5:
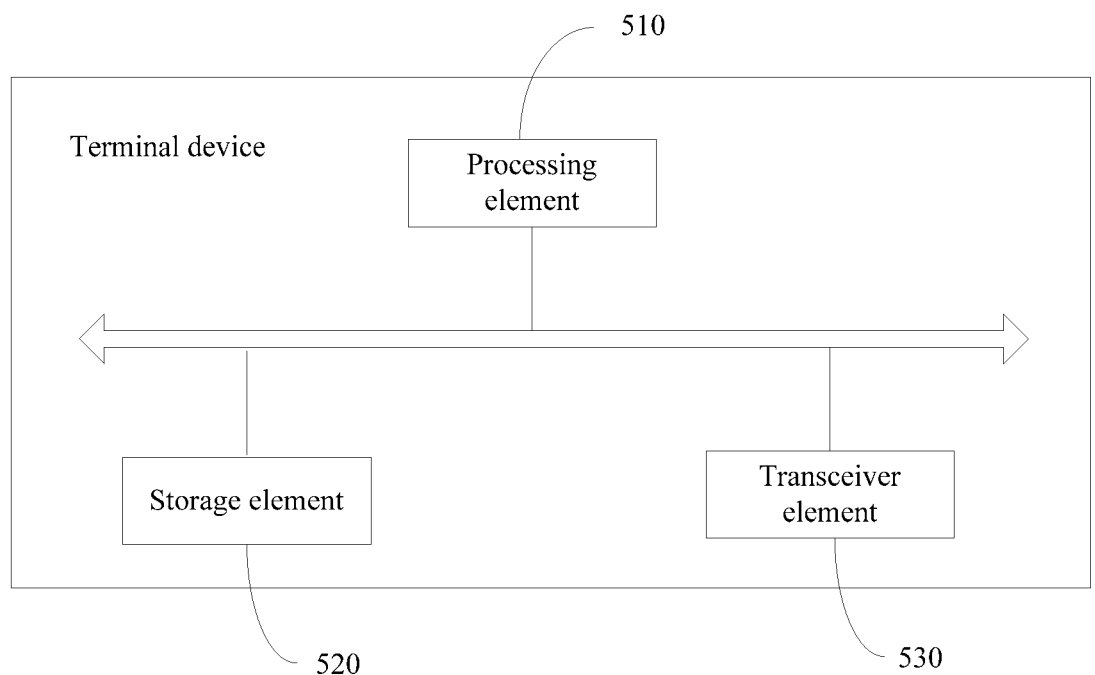
FIG. 5 is a schematic structural diagram of a terminal device according to an embodiment of this application.

FIG. 5 is a schematic structural diagram of a terminal device according to an embodiment of this application. As shown in FIG. 5, the terminal device includes a processing element 510, a storage element 520, and a transceiver element 530. The transceiver element 530 may be connected to an antenna. In a downlink direction, the transceiver element 530 receives, through the antenna, information sent by an access network device, and sends the information to the processing element 510 for processing. In an uplink direction, the processing element 510 processes data of the terminal device, and sends processed data to the access network device through the transceiver element 530. The storage element 520 is configured to store a program for implementing the foregoing method embodiments. The processing element 510 invokes the program to perform some operations in the foregoing method embodiments, so as to implement functions of the units shown in FIG. 4.

In another implementation, the foregoing units may be one or more processing elements configured to perform the foregoing method. These processing elements are disposed on a circuit board of the terminal device. The processing element herein may be an integrated circuit, for example, one or more ASICs, one or more DSPs, or one or more FPGAs. These integrated circuits may be integrated together to form a chip.

For example, the foregoing units may be integrated together and implemented in an SOC form. For example, the terminal device includes an SOC chip configured to perform the foregoing method. The processing element 510 and the storage element 520 may be integrated into the chip, and the processing element 510 invokes the program stored in the storage element 520, to implement the foregoing method or the functions of the foregoing units. Alternatively, at least one integrated circuit may be integrated into the chip, to implement the foregoing method or the functions of the foregoing units. Alternatively, with reference to the foregoing implementations, functions of some units may be implemented by the processing element by invoking the program, and functions of some units may be implemented by using an integrated circuit.

Regardless of which manner is used, the terminal device includes at least one processing element and a storage element. The at least one processing element is configured to perform the method provided in the foregoing method embodiments. The processing element may perform some or all of the steps in the foregoing method embodiments in a first manner, to be specific, by executing a program stored in the storage element; or may perform some or all of the steps in the foregoing method embodiments in a second manner, to be specific, by using a combination of an instruction and a hardware integrated logic circuit of the processing element. Certainly, the method provided in the foregoing method embodiments may be alternatively performed by using a combination of the first manner and the second manner.

As described above, the processing element herein may be a general purpose processing element CPU, or may be one or more integrated circuits configured to implement the foregoing method, for example, one or more ASICs, one or more DSPs, or one or more FPGAs.

The storage element may be one memory, or may be a general name of a plurality of storage elements.

Figure 6:
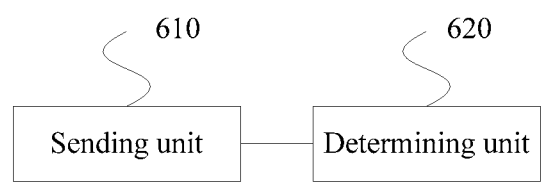
FIG. 6 is a schematic structural diagram of a communications apparatus according to an embodiment of this application.

FIG. 6 is a schematic structural diagram of a communications apparatus according to an embodiment of this application. The communications apparatus may be used for an access network device. As shown in FIG. 6, the access network device includes a sending unit 610, configured to send signaling to a terminal device, where the signaling is used to indicate a sequence type of an uplink reference signal, so that the terminal device determines transmit power of the uplink reference signal based on the sequence type of the uplink reference signal, and sends the uplink reference signal by using the transmit power of the uplink reference signal.

Optionally, the access network device further includes a determining unit 620, configured to determine the sequence type of the uplink reference signal based on at least one of uplink bandwidth allocated by the access network device to the terminal device, an uplink channel quality parameter, indication information used to indicate whether transmit power of the terminal device is limited, and a PHR of the terminal device.

Optionally, the determining unit 620 is specifically configured to: when the uplink bandwidth allocated by the access network device to the terminal device is greater than a preset bandwidth threshold, determine that the sequence type of the uplink reference signal is a first sequence type;

when the uplink bandwidth allocated by the access network device to the terminal device is less than a preset bandwidth threshold, determine that the sequence type of the uplink reference signal is a second sequence type; or when the uplink bandwidth allocated by the access network device to the terminal device is equal to a preset bandwidth threshold, determine that the sequence type of the uplink reference signal is a first sequence type or a second sequence type. The first sequence type includes more orthogonal sequences than the second sequence type, and a peak-to-average power ratio of the first sequence type is greater than that of the second sequence type.

Optionally, the determining unit 620 is specifically configured to: when the uplink channel quality parameter is a path loss of an uplink channel, if the path loss of the uplink channel is less than a preset path loss threshold, determine that the sequence type of the uplink reference signal is a first sequence type; if the path loss of the uplink channel is greater than a preset path loss threshold, determine that the sequence type of the uplink reference signal is a second sequence type; or if the path loss of the uplink channel is equal to a preset path loss threshold, determine that the sequence type of the uplink reference signal is a first sequence type or a second sequence type; or when the uplink channel quality parameter is an SINR, if the SINR is greater than a preset SINR threshold, determine that the sequence type of the uplink reference signal is a first sequence type; if the SINR is less than a preset SINR threshold, determine that the sequence type of the uplink reference signal is a second sequence type, or if the SINR is equal to a preset SINR threshold, determine that the sequence type of the uplink reference signal is a first sequence type or a second sequence type.

Optionally, the determining unit 620 is specifically configured to: when the indication information indicates that the transmit power of the terminal device is not limited, determine that the sequence type of the uplink reference signal is a first sequence type; or when the indication information indicates that the transmit power of the terminal device is limited, determine that the sequence type of the uplink reference signal is a second sequence type.

Optionally, the determining unit 620 is specifically configured to: when the access network device determines, based on the PHR, that the terminal device is in a center of a cell, determine that the sequence type of the uplink reference signal is a first sequence type; or when the access network device determines, based on the PHR, that the terminal device is at an edge of a cell, determine that the sequence type of the uplink reference signal is a second sequence type.

The communications apparatus provided in this embodiment of this application may be configured to perform the method steps corresponding to the foregoing access network device. An implementation principle and a technical effect of the communications apparatus are similar to those of the method steps, and details are not described again.

It should be understood that division of the units of the access network device is merely logical function division. During actual implementation, all or some of the units may be integrated into one physical entity, or may be physically separated. In addition, all of the units may be implemented by software through invocation by a processing element, or may be implemented in a form of hardware. Alternatively, some of the units may be implemented by software through invocation by a processing element, and some of the units may be implemented in a form of hardware. For example, the units may be independently disposed processing elements, or may be integrated into a chip of the access network device. In addition, each unit may be alternatively stored in a memory of the access network device in a form of a program, and a processing element of the access network device invokes and performs a function of the unit. Implementation of other units is similar to this. In addition, all or some of the units may be integrated together, or may be implemented independently. The processing element herein may be an integrated circuit capable of processing a signal. In an implementation process, steps of the foregoing method or the foregoing units may be implemented by using a hardware integrated logic circuit in the processing element, or by using instructions in a form of software. In addition, the sending unit is a sending control unit, and can send information to the terminal device through a sending apparatus, for example, an antenna or a radio frequency apparatus, of the access network device.

For example, the foregoing units may be one or more integrated circuits configured to implement the foregoing method, for example, one or more ASICs, one or more DSPs, or one or more FPGAs. For another example, when one of the foregoing units is implemented by invoking a program by a processing element, the processing element may be a general purpose processor, for example, a CPU, or another processor that can invoke a program. For another example, the units may be integrated together and implemented in an SOC form.

Figure 7:
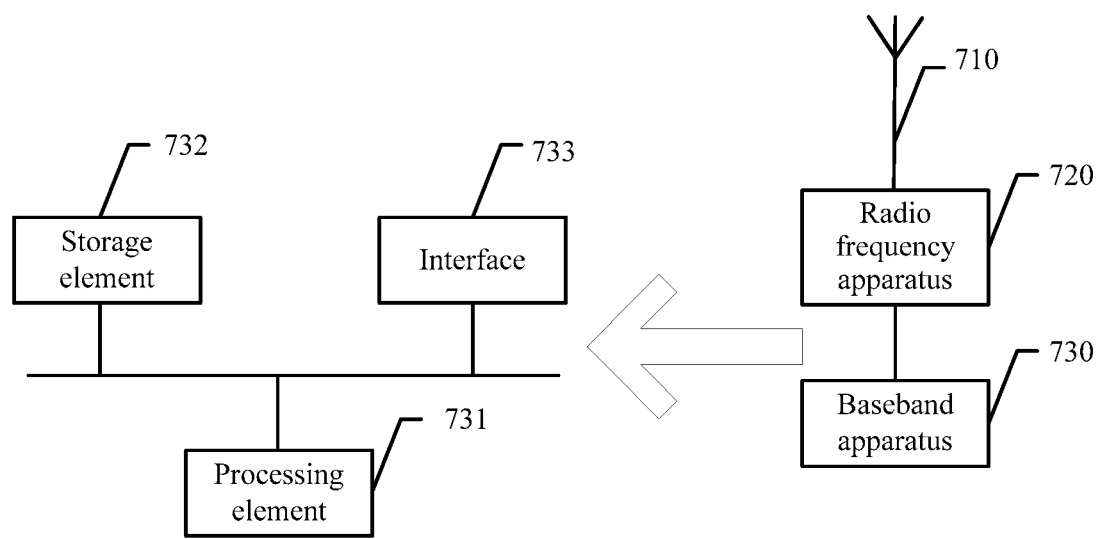
FIG. 7 is a schematic structural diagram of an access network device according to an embodiment of this application.

FIG. 7 is a schematic structural diagram of an access network device according to an embodiment of this application. As shown in FIG. 7, the access network device includes an antenna 710, a radio frequency apparatus 720, and a baseband apparatus 730. The antenna 710 is connected to the radio frequency apparatus 720. In an uplink direction, the radio frequency apparatus 720 receives, through the antenna 710, information sent by a terminal device, and sends the information sent by the terminal device, to the baseband apparatus 730 for processing. In a downlink direction, the baseband apparatus 730 processes information from the terminal device, and sends processed information to the radio frequency apparatus 720, so that the radio frequency apparatus 720 processes the information from the terminal device and then sends processed information to the terminal device through the antenna 710.

The sending unit and the determining unit that are shown in FIG. 6 may be located in the baseband apparatus 730. In an implementation, the determining unit shown in FIG. 6 is implemented by invoking a program by a processing element. For example, the baseband apparatus 730 includes a processing element 731 and a storage element 732, and the processing element 731 invokes a program stored in the storage element 732, to perform the method in the foregoing method embodiments. In addition, the baseband apparatus 730 may further include an interface 733 configured to exchange information with the radio frequency apparatus 720. The interface is, for example, a common public radio interface (CPRI).

In another implementation, the apparatus shown in FIG. 6 may be one or more processing elements configured to perform the foregoing method. These processing elements are disposed on the baseband apparatus 730. The processing element herein may be an integrated circuit, for example, one or more ASICs, one or more DSPs, or one or more FPGAs. These integrated circuits may be integrated together to form a chip.

For example, the foregoing determining units may be integrated together and implemented in an SOC form. For example, the baseband apparatus 730 includes an SOC chip configured to implement the foregoing method. The processing element 731 and the storage element 732 may be integrated into the chip, and the processing element 731 invokes the program stored in the storage element 732, to implement the foregoing method or the functions of the foregoing units. Alternatively, at least one integrated circuit may be integrated into the chip, to implement the foregoing method or the functions of the foregoing units. Alternatively, with reference to the foregoing implementations, functions of some units may be implemented by the processing element by invoking the program, and functions of some units may be implemented by using an integrated circuit.

Regardless of which manner is used, the access network device includes at least one processing element and a storage element. The at least one processing element is configured to perform the method provided in the foregoing method embodiments. The processing element may perform some or all of the steps in the foregoing method embodiments in a first manner, to be specific, by executing a program stored in the storage element; or may perform some or all of the steps in the foregoing method embodiments in a second manner, to be specific, by using a combination of an instruction and a hardware integrated logic circuit of the processing element. Certainly, the method provided in the foregoing method embodiments may be alternatively performed by using a combination of the first manner and the second manner.

As described above, the processing element herein may be a general purpose processor, for example, a CPU, or may be one or more integrated circuits configured to implement the foregoing method, for example, one or more ASICs, one or more DSPs, or one or more FPGAs.

The storage element may be one memory, or may be a general name of a plurality of storage elements.

What is claimed is:

1. An uplink reference signal sending method, the method comprising:
   receiving, by a terminal device, signaling sent by an access network device;
   determining, by the terminal device, a sequence type of an uplink reference signal based on the signaling;
   determining, by the terminal device, transmit power of the uplink reference signal based on the sequence type of the uplink reference signal, wherein the determining comprises:
      determining, by the terminal device, initial power of the uplink reference signal based on the sequence type of the uplink reference signal; and
      selecting, by the terminal device, a relatively smaller one of the initial power and an uplink transmit power threshold as the transmit power of the uplink reference signal; and
   sending, by the terminal device, the uplink reference signal by using the transmit power of the uplink reference signal.

2. The method according to claim 1, wherein the signaling is used to indicate the sequence type of the uplink reference signal.

3. The method according to claim 1, wherein there is a correspondence between information indicated by the signaling and the sequence type of the uplink reference signal, and wherein the determining a sequence type of an uplink reference signal based on the signaling comprises:
   determining, based on the correspondence, the sequence type of the uplink reference signal corresponding to the information indicated by the signaling.

4. The method according to claim 1, wherein the determining a sequence type of an uplink reference signal based on the signaling comprises:
   determining the sequence type of the uplink reference signal based on sending information of the signaling.

5. The method according to claim 4, wherein the sending information of the signaling comprises a scrambling manner of the signaling, a time-frequency resource occupied by the signaling, or a format of the signaling.

6. The method according to claim 1, wherein determining the initial power of the uplink reference signal based on the sequence type of the uplink reference signal comprises:
   determining, by the terminal device, the initial power of the uplink reference signal based on a power parameter configured by the access network device, wherein the power parameter comprises a parameter used to indicate a power offset, and wherein the sequence type of the uplink reference signal is used to adjust the power offset.

7. The method according to claim 6, wherein the uplink transmit power threshold is one of a maximum uplink transmit power or a difference between maximum uplink transmit power and physical uplink shared channel transmit power.

8. The method according to claim 1, wherein:
   determining the initial power of the uplink reference signal based on the sequence type of the uplink reference signal comprises:
      determining, by the terminal device, initial power of the uplink reference signal based on a power parameter configured by the access network device, wherein the sequence type of the uplink reference signal is used to adjust the initial power of the uplink reference signal and generate adjusted initial power; and
   selecting, by the terminal device, a relatively smaller one of the initial power and an uplink transmit power threshold as the transmit power of the uplink reference signal comprises:
      selecting, by the terminal device, a relatively smaller one of the adjusted initial power of the uplink reference signal and an uplink transmit power threshold as the transmit power of the uplink reference signal.

9. The method according to claim 8, wherein the uplink transmit power threshold is one of a maximum uplink transmit power or a difference between maximum uplink transmit power and physical uplink shared channel transmit power.

10. An apparatus, the apparatus comprising at least one processor and a memory coupled to the at least one processor, the memory storing instructions executable by the at least one processor, the instructions instructing the at least one processor to:
   receive signaling sent by an access network device;
   determine a sequence type of an uplink reference signal based on the signaling;
   determine transmit power of the uplink reference signal based on the sequence type of the uplink reference signal, wherein the determining comprises:
      determining initial power of the uplink reference signal based on the sequence type of the uplink reference signal; and
      selecting a relatively smaller one of the initial power and an uplink transmit power threshold as the transmit power of the uplink reference signal; and
   send the uplink reference signal by using the transmit power of the uplink reference signal.

11. The apparatus according to claim 10, wherein the signaling is used to indicate the sequence type of the uplink reference signal.

12. The apparatus according to claim 10, wherein there is a correspondence between information indicated by the signaling and the sequence type of the uplink reference signal, and wherein the instructions instruct the at least one processor to:
    determine, based on the correspondence, the sequence type of the uplink reference signal corresponding to the information indicated by the signaling.

13. The apparatus according to claim 10, wherein the instructions instruct the at least one processor to:
    determine the sequence type of the uplink reference signal based on sending information of the signaling.

14. The apparatus according to claim 13, wherein the sending information of the signaling comprises a scrambling manner of the signaling, a time-frequency resource occupied by the signaling, or a format of the signaling.

15. The apparatus according to claim 10, wherein the instructions instruct the at least one processor to:
    determine the initial power of the uplink reference signal based on a power parameter configured by the access network device, wherein the power parameter comprises a parameter used to indicate a power offset, and wherein the sequence type of the uplink reference signal is used to adjust the power offset.

16. The apparatus according to claim 15, wherein the uplink transmit power threshold is maximum uplink transmit power or a difference between maximum uplink transmit power and physical uplink shared channel transmit power.

17. The apparatus according to claim 10, wherein the instructions instruct the at least one processor to:
    determine the initial power of the uplink reference signal based on a power parameter configured by the access network device, wherein the sequence type of the uplink reference signal is used to adjust the initial power of the uplink reference signal and generate adjusted initial power; and
    select a relatively smaller one of the adjusted initial power of the uplink reference signal and an uplink transmit power threshold as the transmit power of the uplink reference signal.

18. The apparatus according to claim 17, wherein the uplink transmit power threshold is maximum uplink transmit power or a difference between maximum uplink transmit power and physical uplink shared channel transmit power.

19. A non-transitory computer-readable storage medium, the non-transitory computer-readable storage medium comprising a program, wherein the program, when executed by at least one processor, causes the following steps to be performed:
    receiving signaling sent by an access network device;
    determining a sequence type of an uplink reference signal based on the signaling;
    determining transmit power of the uplink reference signal based on the sequence type of the uplink reference signal, wherein the determining comprises:
        determining initial power of the uplink reference signal based on the sequence type of the uplink reference signal; and
        selecting a relatively smaller one of the initial power and an uplink transmit power threshold as the transmit power of the uplink reference signal; and
    sending the uplink reference signal by using the transmit power of the uplink reference signal.

20. The non-transitory computer-readable storage medium according to claim 19, wherein the signaling is used to indicate the sequence type of the uplink reference signal.

* * * * *